T. A EDISON.
ELECTROMOTOR ESCAPEMENT.
No. 103,035. Patented May 17, 1870.
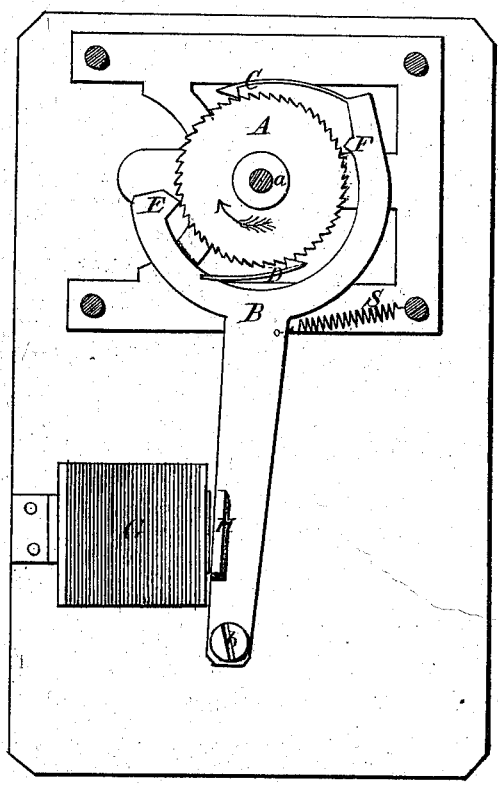
Witnesses:
Inventor:
Thomas A. Edison

United States Patent Office.

THOMAS A. EDISON, OF NEW YORK, N. Y.

Letters Patent No. 103,035, dated May 17, 1870.

IMPROVEMENT IN ELECTRO-MOTOR ESCAPEMENTS.

The Schedule referred to in these Letters Patent and making part of the same

To all whom it may concern:

Be it known that I, THOMAS A. EDISON, of the city of New York, in the county and State of New York, have invented certain new and useful Improvements in Electro-motor Escapements; and I do hereby declare that the following is a full, clear, and exact description thereof, reference being had to the accompanying drawing, which forms part of this specification.

The object of this invention is to provide a novel and efficient means whereby an intermittent rotary motion in one direction may be communicated to a wheel and shaft by the vibrations of the armature of an electro-magnet, while, at the same time, by simply suspending the action of the electro-magnet, the said wheel and shaft may be securely held at any desired point in its revolution.

In the accompanying drawing, which is a front elevation of my invention—

A designates a wheel mounted upon a shaft, $a$, and provided with ratchet-shaped teeth upon its periphery.

B is a forked lever, which is movable upon the pivot or arbor $b$, and is provided with two spring-pawls or clicks, C and D, which engage with the teeth of the wheel A at two opposite points or sides of its periphery.

E and F are stops secured to or formed upon the forked lever B, and these stops are so arranged as to act alternately at opposite points upon the teeth of the wheel A, as will be hereinafter described.

G is an electro-magnet, the armature, H, of which is secured to the lever B.

S is a retracting spring, which retains the lever B in the position shown in the drawing, when the electro-magnet G is not in action.

The manner in which this device operates is as follows:

When a current of electricity passes through the coil of the electro-magnet G, its attraction for the armature H causes the lever B to be moved toward said magnet.

The pawl or click D engages with a tooth of the wheel A, and causes it to revolve, in the direction shown by the black arrow, until its motion is arrested by the stop E coming in contact with another of its teeth, as shown in the drawing. The click D at the same time slips over one tooth of the wheel A.

When the electric current is interrupted, the attractive force of the electro-magnet G is no longer exerted upon the armature H, and the spring S causes the lever B to return to its normal position.

During the latter movement, a reverse action takes place, by means of the click D and the stop F, the effect of which is to advance the wheel A still further in the same direction as before. This action may be repeated indefinitely, and an intermittent rotary motion communicated to the wheel A by the vibration of the armature H of the electro-magnet G.

When the lever B is at rest at either extremity of its vibration, one of the stops E or F rests between two teeth of the wheel A, thus holding it in the desired position until the lever is again moved.

The ratchet-wheel and escapement, when arranged as described, may be placed upon a shaft midway between the bearings of said shaft, without necessarily being placed close to the frame, in order to accommodate the stops. In the construction and operation of printing and dial-telegraphs this is often a great advantage.

This improved escapement has several important advantages over those employing rigid pawls or clicks, pivoted or hinged to the lever of the armature, and having screw-stops attached to the frame; for instance, the jarring and vibrating caused by the rapid movements of the lever in such above-referred-to devices, has a tendency to continually loosen the pivots or screws by which the pawls or clicks are attached to the lever, and the same effect is produced upon screw-stops when arranged upon the frame, thereby throwing the apparatus out of proper adjustment.

By the use of spring-pawls or clicks permanently attached to the lever, and by arranging the stops upon the lever so as to form a part thereof, as in my present escapement, all danger of the apparatus being thrown out of adjustment, by the loosening of any of the parts, is entirely obviated.

Having thus described my invention,

What I claim as new, and desire to secure by Letters Patent, is—

1. The combination of the click C, stop E, lever B, and toothed wheel A, with the electro-magnet G and armature H, substantially as and for the purposes herein specified.

2. The combination of the click D, stop F, lever B, and toothed wheel A, with the electro-magnet G and armature H, substantially as and for the purposes herein specified.

3. The combination with an electro-magnet, G, of a vibrating lever, B, provided with the stops E F, one or both, and clicks C D, one or both, arranged and operating substantially as herein specified.

4. The combination of the clicks C and D, stops E and F, lever B, spring S, toothed wheel A, armature H, and electro-magnet G, substantially as and for the purpose herein specified.

THOMAS A. EDISON.

Witnesses:
M. M. LIVINGSTON,
FRANK L. POPE.